Jan. 13, 1959   L. V. GUILD   2,868,316
APPARATUS FOR SEPARATING, IDENTIFYING
AND MEASURING GASES
Filed May 31, 1952   3 Sheets-Sheet 1

INVENTOR.
Lloyd V. Guild
BY William B. Jaspert
Attorney

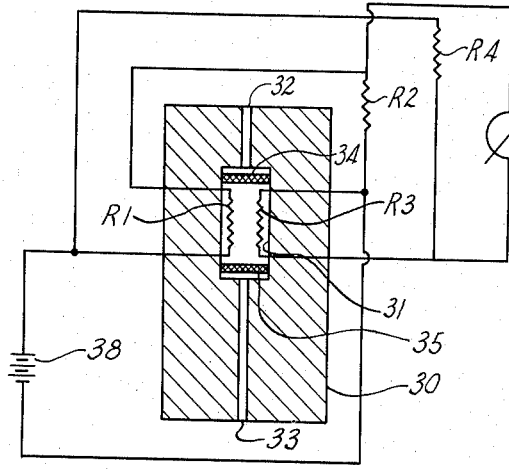
Fig. 3
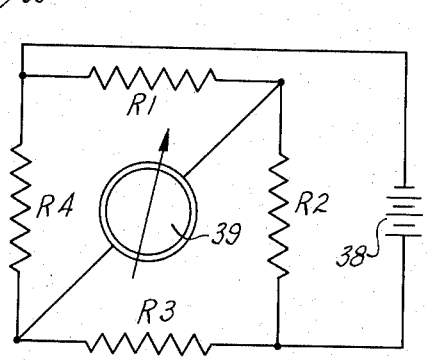
Fig. 4
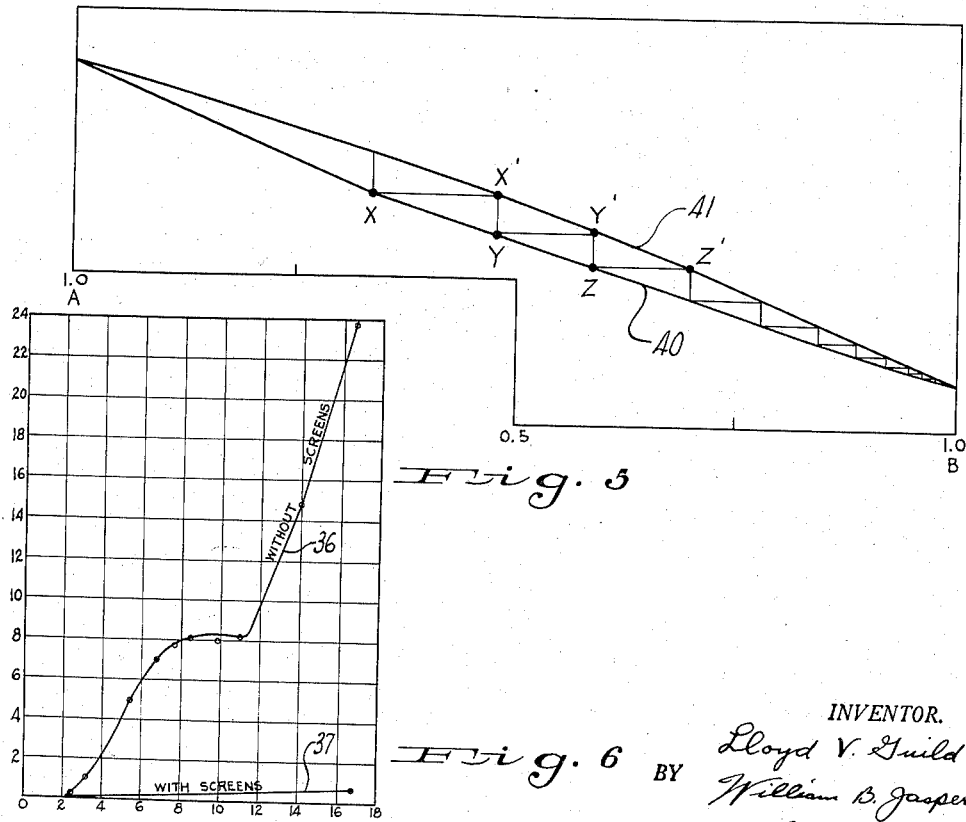
Fig. 5
Fig. 6
INVENTOR.
Lloyd V. Guild
BY William B. Jaspert
Attorney.

INVENTOR.
Lloyd V. Guild
BY William B. Jaspert
Attorney.

2,868,316

APPARATUS FOR SEPARATING, IDENTIFYING AND MEASURING GASES

Lloyd V. Guild, Library, Pa.

Application May 31, 1952, Serial No. 290,865

1 Claim. (Cl. 183—4.5)

This invention relates to improvements in apparatus for separating, identifying and measuring gases, and is particularly adapted for analyzing light hydrocarbon gases by fractional adsorption.

It is among the objects of this invention to provide a column of adsorption material for separating fractions of gases which is shaped to maintain as a constant the ratio of the change of the gas movement to the change in the cross-sectional area of the column.

It is a further object of the invention to provide an improved hot wire device for measuring the relative thermal conductivity of the gases.

It is still a further object of the invention to provide simple and reliable means for controlling the take-off of gas from the fractionating column and for measuring the same.

These and other objects of the invention will become more apparent from a consideration of the accompanying drawings, constituting a part hereof, in which like reference characters designate like parts, and in which—

Fig. 3 is a cross-sectional view of a hot wire device diagrammatically illustrating its electrical connection in a measuring circuit;

Fig. 4 is a diagrammatic view of a Wheatstone bridge employed in the circuit of the hot wire system of Fig. 3;

Fig. 5 is a phase diagram of a binary mixture of gases expressed in mole fractions plotted against the adsorption expressed in ml./gm.;

Fig. 6 is a graph which plots the change in thermal conductivity against the flow in ml. per minute of butane gases with and without screens;

Figure 7:
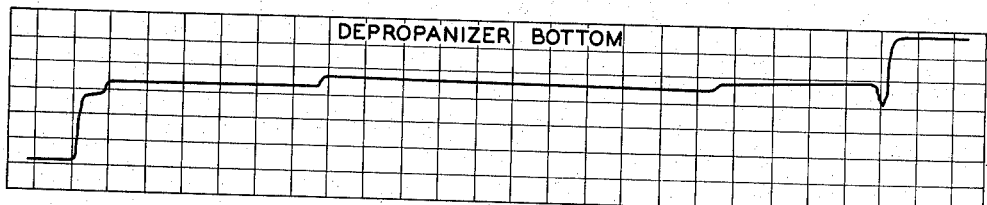
Figure 8:
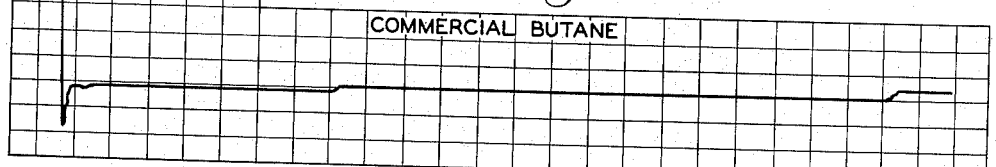
Figure 9:
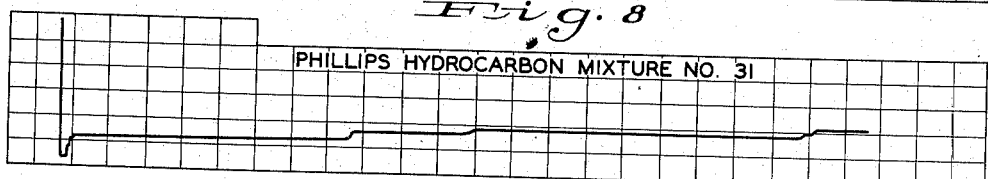
Figure 10:
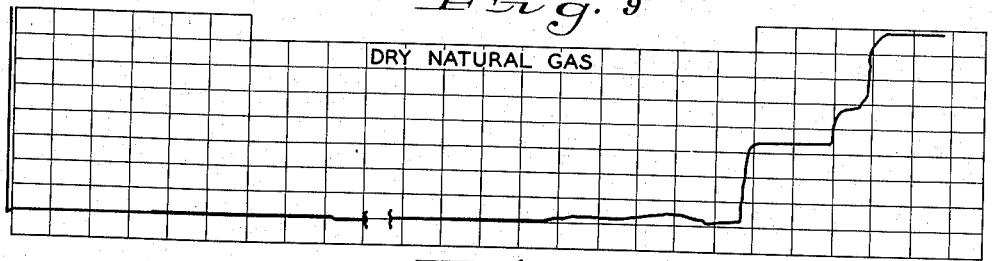
Figure 11:
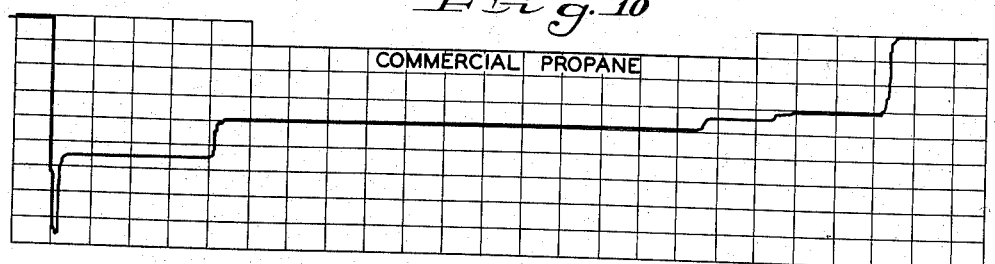
Figure 12:
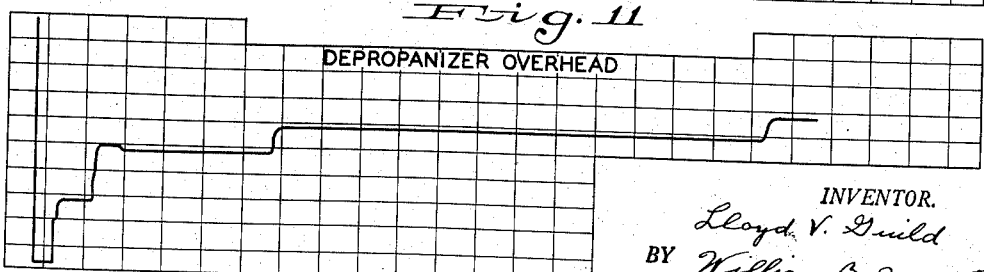

Fig. 7 graphically illustrates the analysis of a depropanizer bottom gas;

Fig. 8 graphically illustrates a similar analysis of a commercial butane gas;

Fig. 9 is a graph illustrating the analyses of a known gas mixtures prepared by Phillips;

Fig. 10 graphically illustrates an analysis of a dry natural gas;

Fig. 11 is a graph illustrating the correlation of results on a series of four analyses of commercial propane; and Fig. 12 graphically illustrates an analysis of a gas sample taken from a depropanizer overhead.

With reference to the apparatus illustrated in Figs. 1 to 4 inclusive, the numeral 1 designates a fractionation column of glass which is shaped to provide rapid and highly efficient separation. The column is reduced in such a way that the ratio of the change of gas movement to the change in the cross-sectional area is a constant. The shape of the column is obtained by the volume or revolution of the equation $X = e^{kY}$, where $e$ is the natural logarithmic constant and $k$ determines the K of $$\frac{\Delta \text{ movement}}{\Delta \text{ cross sectional area}} = K$$

Figure 2:
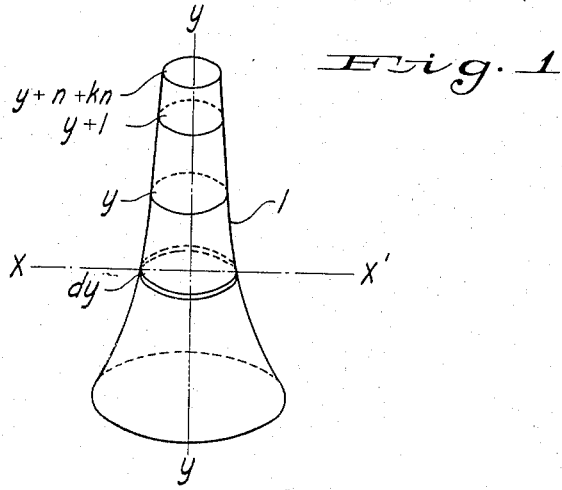
Fig. 2 is an isometric view of a portion of a gas adsorption column.

Thus K determines the rate of reduction of the column and is varied for different types of gases. The following is a mathematical derivation and analysis of the column. Fig. 2 shows a volume of revolution according to the general equation $X = e^{kY}$. The volume of any segment of this is found by integrating between the limits of Y to Y'. The element of volume is $\pi x^2 dy$. The volume of any segment of revolution =

$$\pi \int_{y}^{y'} x^2 dy$$

The requirement of the column is that the volume from $(y)$ to $(y+n)$ = the volume from $(y+n+kn)$. Thus $$\pi \int_{y}^{y+n} x^2 dy = \pi \int_{y+n}^{y+n+kn} x^2 dy$$

Where $k$ is positive and $>1$ N is any postive value. Volume $z$, volume $s$, and $k$ determines the ratio of length A to length B. Obviously if $K=1$ then it is a cylinder. Let $a=n$  $b=n+kn$ $$\pi \int_{y}^{y+a} x^2 dy = \pi \int_{y}^{y+b} x^2 dy$$

Let $X = f(y)$ $$\int f(y) dy = \phi(y)$$

$$\int_{y}^{y+a} [f(y)]^2 dy = \phi(y+a) - \phi(y)$$

$$\int_{y+a}^{y+b} [f(y)]^2 dy = \phi(y+b) - \phi(y+a)$$

$$\phi(y+a) - \phi y = \phi(y+b) - \phi(y+a)$$

$$2\phi(y+a) - \phi y - \phi(y+b) = 0$$

Let $\phi y = e^{cy}$

Then $$2e^{c(y+a)} - e^{cy} - e^{c(y+b)} = 0$$

$$2e^{ca} - 1 - e^{cb} = 0$$

$$\phi y = e^{cy} \quad \phi y = [f(y)]^2$$

$$f(y) = \sqrt{c} e^{cy/2} \quad X = A e^{c/2y}$$

where A is any constant.

C is a constant determining the ratio of $$\frac{kn}{n}$$

and is found from equation C. The shape of the column is therefore the volume of revolution of the equation $X = \bar{e}^{ky}$.

Figure 1:
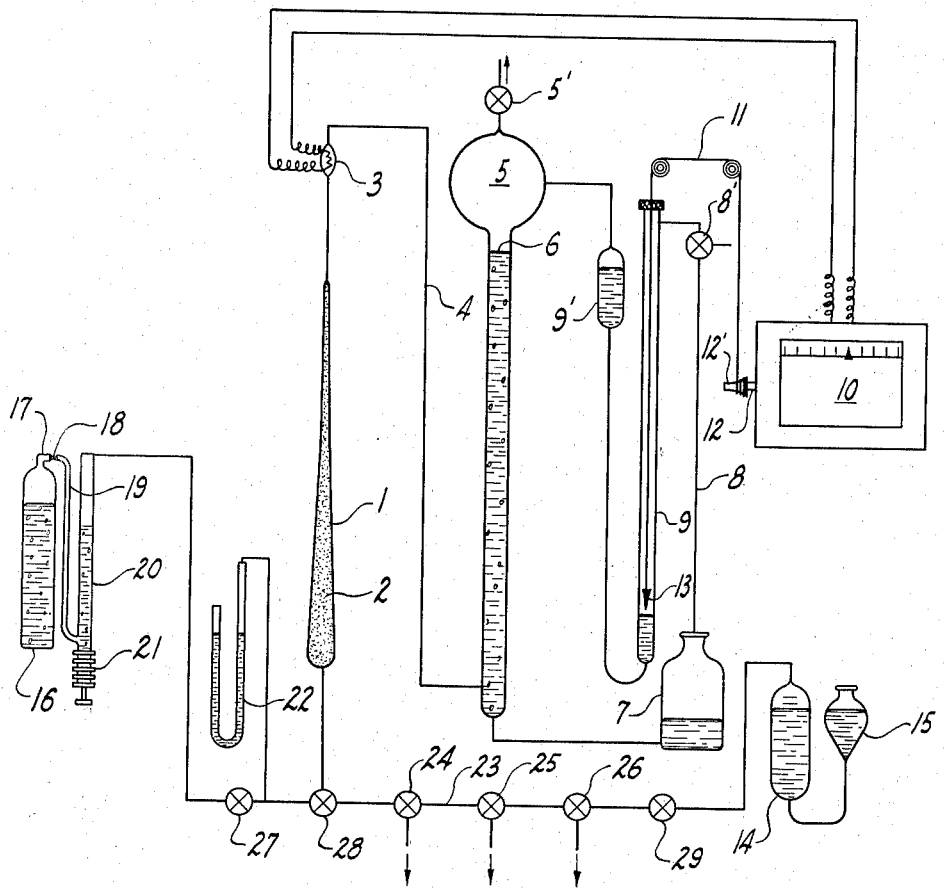
Fig. 1 is a diagrammatic view of a gas separation and collection system embodying the principles of this invention.

Column I, Fig. 1, is filled with activated shell-type charcoal, designated by the numeral 2, of 50 to 60 mesh. Connected to the outlet of the fractionation column is a low volume direct action thermal conductivity cell generally designated by the numeral 3 of the unbalanced bridge type for identifying the fractionated gases. The outlet to the thermal conductivity cell 3 is connected by conduit 4 to an evacuated gas receiver 5, the lower portion of the receiver being filled with mercury, designated by the numeral 6, to approximately the indicated mark under complete vacuum. With the mercury level dropping as the gas enters the evacuated receiver, the mercury goes into the mercury reservoir 7. Connected to the mercury reservoir 7 by the tube 8 is a mercury manometer 9 constructed for a maximum movement of mercury in the right-hand leg. The left leg 9' of manometer 9 is connected to the evacuated receiver 5. A potentiometer recorder 10 is mechanically connected to the right leg of manometer 9 so that the rise in the manometer is automatically recorded by means of the following mechanism. A cable 11 from the recorder drum shaft 12 which is operated by a motor (not shown) terminates in a contact point or electrical terminal 13 in the manometer so that when the mercury rises an electrical connection is completed at the surface of the mercury to energize the drum shaft motor which actuates the potentiometer recorder to record the increase in gas pressure in the gas receiver 5. The recorder 10 is designed to record the change in pressure of the gas receiver 5 and also the thermal conductivity of the gas from cell 3.

A calibrated burette 14 measures the gas sample volume, and connected to the burette 14 is an appropriate levelling bulb 15 for controlling the gas in the burette 14 by means of mercury. A discharge vapor container 16 with an outlet 17 connected to a flow control orifice 18 has a tube connection 19 with a column of mercury 20. The height of the mercury is adjustable by a metallic stainless steel bellows 21. The displacement apparatus 16 and 20 is housed in a constant temperature bath at approximately 63° C. found to be suitable when acetone is used as the displacement liquid in container 16. Under these conditions the acetone vapor is under approximately 200 mm. pressure. The rate of flow of the vapor from the apparatus is controlled by the height of the mercury column 20, which is in turn controlled by the bellows 21, and the pressure drop across the orifice is regulated by the mercury.

Manometer 22 indicates the pressure in the manifold 23. The top of the mercury reservoir 7 and manometer 9 are connected and sealed off to maintain a closed system and make the results independent of atmospheric changes. The entire apparatus is maintained at a constant temperature of approximately 63° C. Valves 24, 25 and 26 are provided to constitute a neon inlet, vacuum connection and sample inlet, respectively. Valve 27 connects the displacement apparatus 16 and 20 with the manifold 23. Valve 28 connects the column 1 and valve 29 the burette 14 with the manifold 23. The numeral 9' designates the left leg of the mercury manometer, of which the numeral 9 designates the right leg.

The identification apparatus or thermal conductivity cell 3 must be a very sensitive direct action device for identifying the gas fractions. The gas volume of this device must be very small to prevent undue mixing of the gas fractions.

The construction of the conductivity cell 3 is more clearly shown in Figs. 3 and 4 of the drawings, and consists of four electrical filaments R1, R2, R3 and R4. R1 and R3 are open wire filaments such as platinum, and R2 and R4 are fixed resistances. R1 and R3 are positioned in a stainless steel or brass box 30. A cylinder chamber 31 receives the elements R1 and R3. Numerals 32 and 33 are the inlet and outlet of the thermal conductivity cell, and fine wire mesh screens 34 and 35 are provided at the inlet and outlet of the cell chamber.

R1 and R3 are heated to a temperature of approximately 100° C., and the cell is balanced with air in chamber 31. When another gas replaces the air in chamber 31, the resistance temperature of filaments R1 and R3 change according to the thermal conductivity of the gas with a resulting change in resistance of R1 and R3, resulting in unbalancing of the bridge. Fig. 4 is a diagrammatic wiring diagram of the cell circuit and the unbalance of the bridge is taken as a measure of the thermal conductivity of the gas.

When the gas is passed directly over the filaments R1 and R3, the gases may be channeled and cool the filament, giving erratic and erroneous readings due to changes in gas flow. This is shown by the curve 36, Fig. 6. By the use of fine mesh screens 34 and 35, Fig. 3, at the inlet and outlet of the cell 31, a very uniform flow of the gases across the entire cell chamber is produced, as shown by the curve 37, Fig. 6. The curves 36 and 37 of Fig. 6 plot the change in thermal conductivity against the flow in ml. per minute of butane gas. The change is very great without the screen and very erratic, depending upon the manner in which the gas channels through the cell. With the screens 34 and 35 the change is very regular and much smaller.

Again referring to Figs. 3 and 4, the numeral 38 designates a source of E. M. F. connected to the filaments and resistances, and the numeral 39 a device for measuring electrical potential, such as a recording potentiometer 10, Fig. 1.

Before describing the operation of the gas separation, collection and gas recording apparatus, a brief description of the basic principles of gas adsorption may be helpful to a better understanding of the results to be obtained.

Fractional adsorption can be accomplished in binary mixtures or more complex mixtures when the adsorption of one gas differs from the other and when Van der Waals' adsorption predominates. If a binary mixture of two gases of known composition but possessing different adsorption characteristics is brought into contact with an adsorbent such as the charcoal 2 in the column 1, Fig. 1, which adsorbent has previously been freed of adsorbate, an equilibrium is established. Considering this from the standpoint of dynamic equilibrium, we have the unadsorbed gas in the gas phase with the partial pressure of each gas established by the composition. We may also consider the adsorbed gases as being in an adsorbed phase with the adsorbed gas in dynamic equilibrium with the gas phase. This equilibrium may be represented by standard phase diagrams, as shown in Fig. 5 of the drawings. The diagram represents a binary mixture of gas A and B, and the composition of A and B expressed in mole fractions as ordinate is plotted against the adsorption expressed in ml./gm. as the abscissa. Under equilibrium conditions in the diagram the lower line 40 represents the composition of the gas mixture in the adsorbed phase while the upper line 41 represents the composition of the unadsorbed phase. If the composition of a completely arbitrary gas mixture is represented by X when all of the gas is completely adsorbed by the adsorbent, then if a partial desorption occurs, the composition of the first gas evolved will be represented by $X^1$. In the phase diagram shown, A is more highly adsorbed than gas B. When the unadsorbed gas is readsorbed on adsorbate free adsorbent, the composition of the adsorbed phase will be designated by Y. If then another partial desorption occurs, the composition of the phase vapor evolved will be designated by $Y^1$. This unadsorbed gas is again readsorbed with the composition designated by Z and a further desorption produces the gas phase composition designated by $Z^1$. It is obvious that if this process would continue with a large number of adsorptions and desorptions, eventually pure A and pure B would be obtained. Although only a binary mixture has been shown as a sample, similar separations could be made with more complex mixtures.

By means of the herein described apparatus, gas samples may be analyzed in from one to three hours, whereas by use of equipment such as is disclosed in Turner Patent 2,398,818, dated April 23, 1946, the analysis required a lengthy period of time, seven to nine hours, and the equipment used is rather complex, requiring special precautions when unsaturated hydrocarbons were present.

In the use of the special tapered column illustrated in Figs. 1 and 2 of the drawings, filled with shell charcoal adsorbent material, the adsorbent is first freed of all adsorbate by heat and evacuation and the adsorbent is covered either with a lightly adsorbed gas or liquid mercury. The gas sample which has been supplied to the calibrated burette 14 through the sample inlet 26 of the manifold 23 is charged into the tapered column 1 and is completely adsorbed in the large portion thereof. It is driven through the length of the column by heavy vapor such as acetone or hexane supplied through the displacement apparatus 16. As the sample is forced through column 1 it replaces the lightly adsorbed gas in the column and the movement of the sample through the adsorbent material brings about a series of adsorptions and desorptions required to effect a separation, so that the mixture separates out into layers or strata of pure gases with a mixed zone between each layer or fraction. The lightest adsorbed gases occur in the small diameter of the column, and when further driven through the column they are discharged from the small end as nearly pure gases. By using a tapered column the mixed zone is reduced to a small volume compared to the total sample.

The gases are identified by measuring a physical property of the gas as by passing it through the conductivity cell 3 and the volume measured in evacuated receiver 5.

The identity is plotted by the electronic recording potentiometer 10 as abscissa against volume as ordinate. The thermal conductivity of the gas has been chosen as the particular physical property to be used in the identification of the gas fractions because of the simplicity of the use of the filaments with the unbalanced bridge.

To more definitely identify the process with the apparatus shown in Fig. 1, the calibrated burette 14 receives and measures the proper size sample, which is ordinarily of the magnitude of 300 ml. After the sample has been admitted to the bottom of column 1 through manifold 23, the rate of flow is controlled by the mercury column 20, and by varying the pressure across orifice 18, this being accomplished by the adjustment of the stainless steel bellows 21. When the first fraction leaves the column 1 it passes through cell 3 for identification and into the evacuated receiver 5 for gas volume measurement. Constant pressure is maintained during this discharge period in column 1 by means of the mercury column 6 in the evacuated gas receiver 5, the latter being provided with a connection 5' to a vacuum source. Thus the gas fractions are bubbled through the mercury column 6 maintaining automatic control of the pressure. Manometer 9 registers the pressure in the receiver 5 and the recorder 10 plots this change in pressure as abscissa, which is a measure of the gas volume in receiver 5, while the thermal conductivity is plotted as ordinate and represents the identity of the fractions. When the discharge vapor appears in cell 3 the gas sample has been completely discharged from the column 1. The column is then removed and another column inserted and the gas receiver evacuated, and the apparatus is then ready for another analysis. Ordinarily no attempt is made to recover the adsorbent and new adsorbent is used for each analysis.

The graphs of Figs. 7 to 12 inclusive made by the recorder 10 are representative of the measurement and identification of the gas fractions for the typical gases identified on the charts.

The charting of the gas volume is made possible by the construction of the take-up spool 12', Fig. 1, such as will make the chart length, called $l_c$ a straight line function of volume.

$$l_c = SN$$

$$N = \frac{1}{2\pi R}$$

$$l = \frac{l_c 2\pi R}{S}$$

where:

$S$ = circumference of recorder drum
$N$ = number of turns of chart
$R$ = radius of chart spool Let $$k_{12} = \frac{2\pi}{S} \qquad l = l_c r k_{12}$$

Then the relation of volume to chart length becomes $$V(\text{ml. at 760 mm. and bath temp}) = (V_1 + l_c R k_{12} k_5) \left[ \frac{7601 l_c R k_{12} k_5 + l_c R k_{12} k_6 V_2 - l_c^2 R^2 k_{12}^2 k_5 k_6}{760 V_2 - 7601_c R k_{12} k_5} \right]$$

If $V = ml_c$ then $l_c$ is a straight line function of volume with $m$ the slope of the curve and it establishes the chart length per unit volume.

Since R is then not a constant it is possible to solve the above equation for R for any value of $l_c$ for any change $dl_c$ and thus construct a spool from the above equation.

It is evident from the foregoing description of this invention that by use of the equipment an analysis can be made without need of experienced operators and reproducable results on the same sample with a maximum deviation of the order of 0.2 percent can be obtained depending upon the type of sample.

Although one embodiment of the invention has been herein illustrated and described, it will be evident to those skilled in the art that various modifications may be made in the details of construction without departing from the principles herein set forth.

I claim:

In apparatus for separating gas fractions, a fractionating column of adsorbent material, a discharge vapor container connected at one end of the column for charging a displacement vapor into the column, said container having a flow control orifice to a column of mercury, and means for adjusting the height of the mercury column to regulate the pressure drop of the displacement vapor across said orifice for controlling the rate of flow of vapor from said container.

References Cited in the file of this patent

UNITED STATES PATENTS

| | | |
|---|---|---|
| 1,810,141 | Ledoux | June 16, 1931 |
| 2,325,695 | McAfee | Aug. 3, 1943 |
| 2,398,818 | Turner | Apr. 23, 1946 |
| 2,429,555 | Langford et al. | Oct. 21, 1947 |
| 2,519,873 | Berg | Aug. 22, 1950 |
| 2,557,008 | Poole | June 12, 1951 |